United States Patent [19]

Takanashi et al.

[11] Patent Number: 4,723,130

[45] Date of Patent: Feb. 2, 1988

[54] THERMAL PRINTHEAD

[75] Inventors: Itsuo Takanashi, Kamakura; Hideshi Tanaka, Yokohama; Terumi Ohara, Yokohama; Kenichi Miyazaki, Yokohama; Toshinori Takahashi, Kawasaki; Hiroki Kitamura, Tokyo; Tadao Shinya; Yutaka Mizoguchi, both of Yokohama, all of Japan

[73] Assignee: Victor Company of Japan, Limited, Yokohama, Japan

[21] Appl. No.: 934,225

[22] Filed: Nov. 20, 1986

[30] Foreign Application Priority Data

Nov. 27, 1985 [JP] Japan ................................ 60-265003

[51] Int. Cl.[4] ........................ G01D 15/10; H05B 1/00; H01C 1/012

[52] U.S. Cl. ................................ 346/76 PH; 219/216; 219/543; 338/308; 338/309

[58] Field of Search .................... 346/76 PH; 219/216, 219/543; 338/308, 309; 427/58, 96

[56] References Cited

U.S. PATENT DOCUMENTS 3,961,155 6/1976 Weldon et al. ..................... 219/216
4,401,881 8/1983 Saito .................................... 219/216
4,516,136 5/1985 Willcox ......................... 346/76 PH

FOREIGN PATENT DOCUMENTS 57-82064 5/1982 Japan ................................. 400/120

*Primary Examiner*—E. A. Goldberg
*Assistant Examiner*—Gerald E. Preston
*Attorney, Agent, or Firm*—Jordan and Hamburg

[57] ABSTRACT

A structure of a thermal head of the type using an ink paper or a heat-sensitive paper is disclosed. The structure includes an array of units each comprising a single resistance body and a pair of electrode members which respectively correspond to a first and a second heat-generating portions positioned at both ends of the resistance body, the electrode members being adapted to energize the resistance body. At least one of the first and second heat-generating portions of the resistance body is divided into a plurality of heat-generating members, and so is done one of the electrode members which is associated with those heat-generating members.

5 Claims, 5 Drawing Figures

Fig. 1
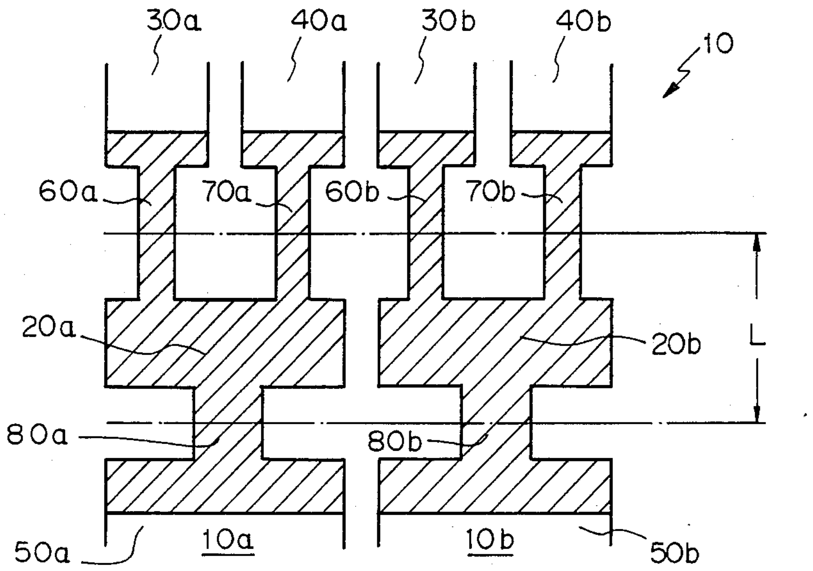
Fig. 2
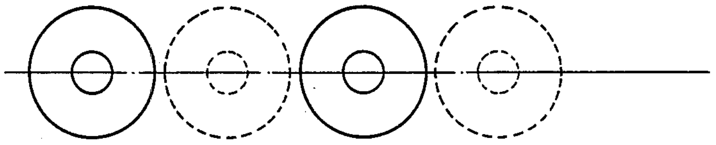
Fig. 3A
Fig. 3B
Fig. 3C
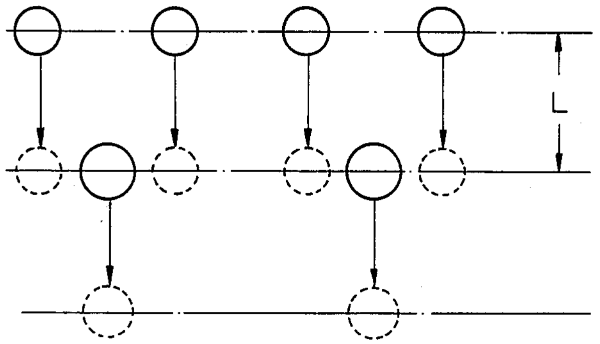

THERMAL PRINTHEAD

BACKGROUND OF THE INVENTION

The present invention relates to the structure of a thermal head applicable to a thermal printer of the type using a paper to which thermally fusible or sublimable ink is applied or of the type using a heat-sensitive paper.

A prior art thermal head mounted on a thermal printer includes a heat-generating resistance body having one or more heat-generating portions, and a pair of electrode portions which are associated with the resistance body, a plurality of such resistance body and electrode units being arranged in an array. A problem with this kind of prior art thermal head is that not more than one kind of printing patterns is available, that is, it is impossible to vary a pattern configuration for the purpose of controlling density or thickness of printing.

SUMMARY OF THE INVENTION

It is an object of the present invention to provide a thermal head for a thermal printer which is capable of printing out various kinds of printing patterns.

It is another object of the present invention to provide a thermal head for a thermal printer which is capable of printing out patterns in a variable degree of printing density.

It is another object of the present invention to provide a thermal head for a thermal printer which is capable of varying a printing pattern controlled to the density of printing.

It is another object of the present invention to provide a generally improved thermal head for a thermal printer.

In a thermal head having an array of units each comprising a single resistance body and a pair of electrode members respectively provided for at opposite sides thereof to feed a current flowing through the resistance body, at least one of the electrode members in each of the units comprises a plurality of divided electrodes, and the resistance body comprises an island and a plurality of first heat-generating portions branching out from the island and connecting thereof with the plurality of divided electrodes respectively, and a second heat-generating portion branching out from the island and connecting thereof with another of the electrode members.

The above and other objects, features and advantages of the present invention will become more apparent from the following detailed description taken with the accompanying drawings.

BRIEF DESCRIPTION OF THE DRAWINGS

FIG. 1 is a fragmentary plan view of a thermal head for a thermal printer in accordance with the present invention; and FIGS. 2 and 3A, 3B, 3C are diagrams showing printing patterns available with the thermal head of FIG. 1.

DESCRIPTION OF THE PREFERRED EMBODIMENT

Referring to FIG. 1 of the drawings, a thermal head embodying the present invention is shown and generally designated by the reference numeral 10. The thermal head 10 includes a plurality of heating units which are arranged in an array, although only two heating units 10*a* and 10*b* are shown in the drawing. The two heating units 10*a* and 10*b* have resistance bodies 20*a* and 20*b* respectively. Each of the resistance bodies 20*a* and 20*b* has uniform thickness and material. Bisected electrodes 30*a* and 40*a* are electrically interconnected to one end of the resistance body 20*a*, and bisected electrodes 30*b* and 40*b* to one end of the resistance body 20*b*. Electrically interconnected to the other end of the resistance bodies 20*a* and 20*b*, respectively, are non-divided or unitary electrodes 50*a* and 50*b*. The resistance body 20*a* is provided with heat-generating portions 60*a*, 70*a* and 80*a* while the resistance body 20*b* is provided with heat-generating portions 60*b*, 70*b* and 80*b*. The heat-generating portions 60*a* and 60*b* are associated with the electrodes 30*a* and 30*b*, respectively, and the heat-generating portions 70*a* and 70*b* are associated with the electrodes 40*a* and 40*b*, respectively. Further, the heat generating portions 80*a* and 80*b* are associated with the electrodes 50*a* and 50*b*, respectively. While the heat-generating portions 60*a*, 60*b*, 70*a* and 70*b* are equal in size to each other, each of the heat-generating portions 80*a* and 80*b* is provided with an approximately two times greater width but ½ times shorter length than the heat-generating portion 60*a*, 60*b*, 70*a* or 70*b* so that the electric resistance of the heat-generating portion 80*a* or 80*b* is approximately a quarter of that of the heat-generating portion 60*a*, 60*b*, 70*a* or 70*b*. The electric resistance of other parts of the resistance body than the heat-generating portions is substantially small compared with that of the heat-generating portions. Accordingly, heat generation from the other parts can be deemed minor for a given current.

In the thermal head 10 constructed as described above, assume that a voltage is applied across the electrode portions 30*a* and 30*b* and associated electrodes 50*a* and 50*b* so as to cause a current to flow through the resistance bodies 20*a* and 20*b*. Then, heat is generated substantially at the heat-generating portions 60*a* and 60*b* resulting that dots are printed in a particular pattern as represented by solid circles in FIG. 2. On the other hand, when a voltage is applied across the electrodes 40*a* and 40*b* and the electrodes 50*a* and 50*b*, the heat-generating portions 70*a* and 70*b* generate heat so that dots are printed out in a pattern as represented by phantom circles in FIG. 2. It is to be noted that in FIG. 2 the large circles and the small circles respectively correspond to a case wherein the amount of current is small and a case wherein it is large, that is, the area of the circle is variable with the amount of current. When the amount of current is large, although the printing area spreads rapidly, nearby dots are prevented from joining each other since every other heat-generating portion generates heat at a time to print out a dot.

When a voltage is applied across the electrodes 30*a*, 30*b*, 40*a* and 40*b* and the electrodes 50*a* and 50*b* at the same time, a current which then flows through each of the heat-generating portions 80*a* and 80*b* is equal to the sum of currents which flow through its associated heat-generating portions 60*a* and 70*a* or 60*b* and 70*b*. In this condition, all the heat-generating portions 60*a*, 60*b*, 70*a*, 70*b*, 80*a* and 80*b* generate heat resulting that a pattern of dots is printed out as indicated by solid circles in FIGS. 3A and 3B. Thereafter, when a voltage is applied in the same manner after moving the thermal head 10 by a distance L between the heat-generating portions 60*a*, 60*b*, 70*a* and 70*b* and the heat-generating portions 80*a* and 80*b*, dots are printed out in a pattern as represented by phantom circles in FIGS. 3B and 3C. Specifically, a dot printed out by the heat-generating portion 80*a* is interspersed between those dots which are printed out by the heat-generating portions 60*a* and 70*a*, thereby substantially filling the space between the dots. Such interpolation allows information to be printed out with high density. In addition, the number of dots is increased to enhance smooth appearance of image printed out.

A circuit for driving the thermal head 10 as shown and described may be implemented with, for example, a drive circuit which is shown in Japanese Laid-open Patent Publication No. 59-107681, which was filed by the same assignee as the present application.

While one electrode in each electrode pair of the thermal head 10 has been shown and described as being bisected, it may be divided into three portions or even to $2^n$ (n being 2 or greater integer) portions. Further, both of the electrodes in each electrode pair may be divided into a plurality of electrode portions, so that the number of the divisions is always greater at one side than at the other side.

In summary, it will be seen that the present invention provides a thermal head which is capable of printing out large dots and small dots as desired. Large dots printed out by the thermal head are prevented from joining each other, thereby promoting high clarity printing. Small dots, on the other hand, are printed out without any significant spacing left therebetween, so that information may be printed with high density and clarity. This means an increased number of dots and thereby provides information printed out with smooth appearance.

Various modifications will become possible for those skilled in the art after receiving the teachings of the present disclosure without departing from the scope thereof.

What is claimed is:

1. In a thermal head having an array of units each comprising a single resistance body and a pair of electrode members respectively provided for at opposite sides thereof to feed a current flowing through said resistance body, the improvement wherein at least one of said electrode members in each of said units comprises a plurality of divided electrodes, and said resistance body comprises an island and a plurality of first heat-generating portions branching out from the island and connecting thereof with said plurality of divided electrodes respectively, and a second heat-generating portion branching out from the island and connecting thereof with another of said electrode members.

2. The improvement as claimed in claim 1, wherein said first heat-generating portions are equal in dimension to each other while said second heat generating portions is two times greater than each of said first heat-generating portions.

3. The improvement as claimed in claim 1, wherein said divided electrodes comprise two divided electrodes.

4. The improvement as claimed in claim 1, wherein said divided electrodes comprise three divided electrodes.

5. The improvement as claimed in claim 1, wherein said divided electrodes comprise $2^n$ divided electrodes, where n is 2 or greater integer.

* * * * *